June 7, 1960
E. H. SCHULTZ
2,939,947
UTILITY POCKET LEVEL
Filed Oct. 13, 1958
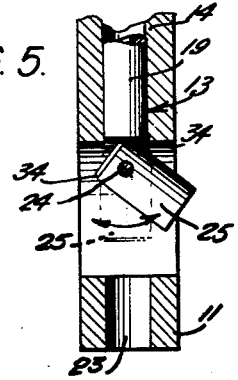
FIG. 5.
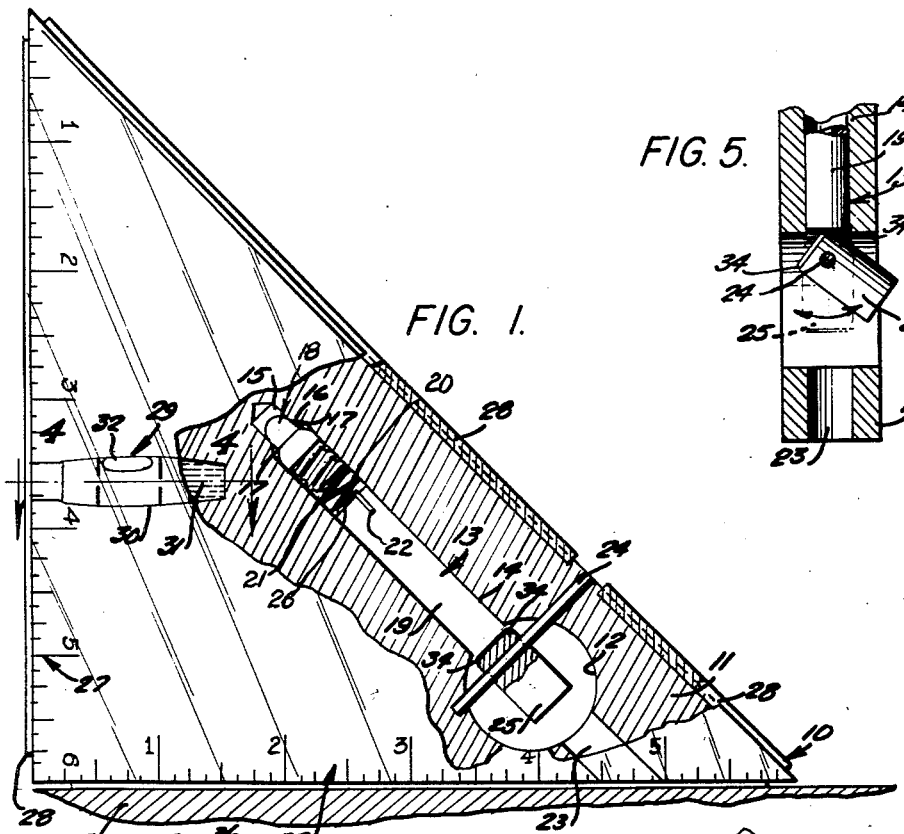
FIG. 1.
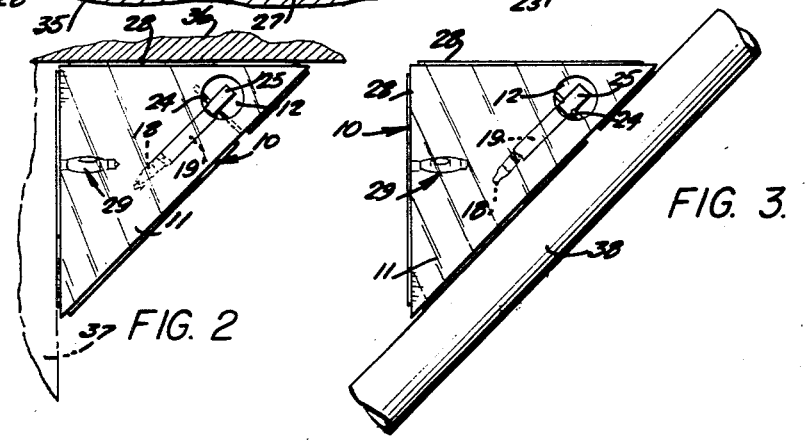
FIG. 2
FIG. 3.
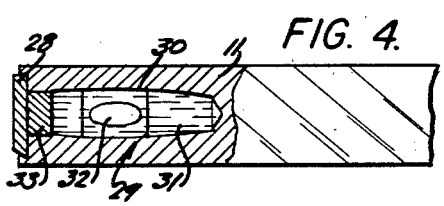
FIG. 4.
INVENTOR.
EDWARD H. SCHULTZ
BY *Victor J. Evans & Co.*
ATTORNEYS

United States Patent Office 2,939,947
Patented June 7, 1960

2,939,947
UTILITY POCKET LEVEL

Edward H. Schultz, Box 552, Buffalo, Minn.

Filed Oct. 13, 1958, Ser. No. 766,981

3 Claims. (Cl. 240—6.44)

This invention relates to a level.

The object of the invention is to provide a level which includes a novel illuminating means as well as a barrel shaped fluid holding cavity.

A further object of the invention is to provide a level that can be used for various types of leveling jobs or operations, and wherein there is provided a means for manually actuating a light so that hard to see areas can be readily observed, and wherein the level of the present invention includes a barrel shaped cavity or recess which permits the user to readily observe the position of the fluid bubble regardless of the position of the level or tool.

A further object of the invention is to provide a level that is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view of the level of the present invention, with parts broken away and in section.

Figure 2 is a view showing the level in another position.

Figure 3 is a view illustrating a further use of the level.

Figure 4 is a sectional view taken on the line 4—4 of Figure 1.

Figure 5 is a fragmentary sectional view illustrating certain constructional details of the present invention.

Referring in detail to the drawings, the numeral 10 indicates the level of the present invention, and the level 10 includes a triangular shaped body member 11 which is provided with a circular opening 12 therein, Figure 1.

The body member 11 is further provided with an elongated bore 13 which communicates with the opening 12, and the bore 13 includes an elongated first portion 14 and a second portion 15, the portion 15 being of smaller diameter than the portion 14 whereby a shoulder 16 is defined between the portions 14 and 15. A resilient ring 17 abuts the shoulder 16.

The numeral 18 indicates a light bulb which is positioned in the bore 13 as shown in Figure 1, and the numeral 19 indicates a battery which is arranged for movement in the portion 14 of the bore 13. A spring member 20 is positioned between the bulb 18 and battery 19, and the spring member 20 includes a coiled portion 21 that surrounds the base of the bulb 18. The spring member 20 further includes an end portion 22 which engages a side of the battery 19 so that when the battery 19 is moved as later described in this application, an electrical circuit will be completed to the bulb 18 so as to energize the bulb 18.

The numeral 23 indicates a clearance opening or cutout which may be drilled or otherwise formed in the body member so as to provide sufficient clearance for permitting the bore 13 to be drilled or otherwise formed.

As shown in the drawings, there is provided a pivot pin 24, and an operator or finger piece 25 is pivotally mounted on the pin 24. The operator 25 engages the outer end of the battery 19, so that by properly manually moving the operator 25 as for example as shown in Figure 5, the battery 19 can be shifted in the bore 13 so that the tip 26 of the battery 19 can be moved into engagement with the bulb 18 to illuminate the bulb.

Certain edges of the body member 11 are adapted to be provided with scale markings or indicia 27. Also, magnets 28 may be secured along certain of the edges of the body member as shown in the drawings.

There is further provided a spirit level which is indicated generally by the numeral 29, and the spirit level 29 includes a barrel shaped cavity or recess 30 which has its intermediate portion of greater diameter than the end portions thereof. The numeral 31 indicates fluid which is arranged in the cavity 30, and the numeral 32 indicates the bubble which is adapted to be visually observed. A plug 33 may be used for sealing or closing off the end of the cavity 30 after the fluid has been inserted therein. The body member 11 is adapted to be made of a suitable transparent material such as a transparent plastic whereby the bubble 32 can be readily observed, and whereby light rays from the bulb 18 can be directed onto the desired area to be illuminated.

From the foregoing, it is apparent that there has been provided a level which includes a novel illuminating means as well as the barrel shaped spirit level 29. With the parts in the position of Figure 1, the circuit to the bulb 18 will not be completed so that the bulb 18 will not be on. However, when it is desired to energize the bulb 18, it is only necessary to manually move the operator 25 on the pin 24 whereby an edge 34 of the operator 25 can be moved into engagement with the outer end portion of the battery 19 as for example as shown in Figure 5. As the operator 25 is pivoted from the broken line position of Figure 5 to the solid line position of Figure 5, the edge 34 will cause the battery 19 to move inwardly in the bore 13 so that the inner tip 26 of the battery 19 will move against the adjacent end of the bulb 18 so that the electrical circuit will be completed through the spring 20 whereby the bulb 18 will be energized. When the operator 25 is manually moved or returned from the solid line position shown in Figure 5 to the broken line position of Figure 5, the camming action of the operator against the battery 19 will be released so that the spring 20 can return the battery 19 to the position shown in Figure 1 so that the electrical circuit to the bulb 18 will be broken whereby the bulb will go off.

Furthermore, the operator 25 can be moved to the solid line position shown in Figure 5 so that the corner 34 of the operator 25 will jam against the adjacent end of the battery 19 so as to maintain the inner tip 26 of the battery 19 against the adjacent end of the bulb 18 so as to complete the circuit to the bulb. Thus, after the operator 25 has been moved to the solid line position shown in Figure 5, manual pressure on the operator 25 can be released and the electrical circuit to the bulb will remain completed until the operator 25 is moved from the solid line position shown in Figure 5 to the position shown in Figure 1.

The recess 30 has a barrel shape and wherein the intermediate portion of the recess or cavity 30 is of greater diameter than the end portions. This construction permits the bubble 32 to be readily observed regardless of the position of the level 10 and this is an improvement over the spirit levels which usually have a curved formation instead of a barrel shaped formation.

As shown in Figure 1, the level 10 may be used in conjunction with the surface 35, or, as shown in Figure 2 the level 10 may be used in conjunction with surfaces 36 and 37, or, as shown in Figure 3 the level can be used on an inclined surface or member such as the member 38.

The light actuating mechanism is very simple and efficient and the various parts can be made of any suitable material and in different shapes or sizes. The arrangement can also be used in a torpedo type of level.

The level can be used either side up and the body member 11 may be made of a suitable plastic material which is unbreakable and the bubble 32 can be read either looking up at the bubble or looking down or looking at the bubble from either side or top. Previous bubbles have been arranged in the form of a curved vial which can only be read on the top side of the curvature but with the barrel shaped novel 29, the bubble can be observed or read from any angle. When pressure is applied to the operator 25 the bulb is energized as previously described, due to the novel switch mechanism. The operator or switch member 25 will serve to energize the bulb when the operator 25 is pushed from either side. The electrical circuit is completed through the spring 20. The magnets 28 can be used for holding the level against a desired surface or member.

If the operator 25 is not moved to the full on position shown in Figure 5 the bulb will light and the bulb will stay lit as long as the operator 25 is maintained in the position of Figure 5. However, when manual pressure on the operator 25 is released, the operator 25 will automatically return to the broken line position in Figure 5 so that the circuit will be broken to the bulb.

Furthermore, by moving the operator 25 to full on position as indicated by the solid line position shown in Figure 5, manual pressure on the operator 25 can be released and the circuit will be kept completed until the operator 25 is moved from the position shown in Figure 5 back to the position shown in Figure 1. Thus, the device or operator in the position of Figure 5 stays immobile whereby the light bulb can be left on for a predetermined period of time until it is desired to turn the bulb off.

The bubble cavity 30 need only be slightly larger in its center than it is at its ends in order to achieve the barrel effect or construction. This must not be more than 1/32 of an inch. Otherwise the radius of the belly of the cavity is too short and the bubble will move too slowly and it is difficult or too critical to read.

The various parts can be located in different places in the triangle. A torpedo level may also be made to contain the bubble, but in such an instance three bubbles would be required since there are only two edges to such a level.

This mechanism is of simple design or construction and does not require any wires and the level can be used upside down or in a vertical or horizontal or 45 degree angular position and it can either be used above or below an object.

The bubble chamber or cavity 30 can be drilled into the body member 11 and the bubble will seek its level regardless of the position of the device. Furthermore, no glass vial is required since the plastic body member 11 serves that purpose. The level can also be used as a small square with a 45 degree angle on one side. If desired, a glass vial can be incorporated in the device and such glass vial may also have a barrel shape.

In Figure 3 the device is shown being used on an inclined pipe or other member 38, while in Figure 1 the device is shown on a horizontal member 35. The scale markings 27 can be used for making suitable measurements or calculations.

Minor changes in shape, size and rearrangement of details coming within the field of invention claimed may be resorted to in actual practice, if desired.

I claim:

1. In a level, a transparent triangular body member having a cavity with a bubble therein extending from one side of said body member at right angles thereto and in parallel relation to the other side of said body member, said body member being provided with a circular opening therein, there being an elongated bore in said body member communicating with said opening, said bore including a first portion and a second portion which is of less diameter than said first portion, said first and second portions coacting to define therebetween a shoulder, a resilient ring abutting said shoulder, a bulb having a portion thereof engaging said ring, a battery movably positioned in the first portion of said bore and mounted for movement into and out of engagement with said bulb, a spring member positioned between said bulb and battery, a pin mounted in said body member and extending across the opening therein, and an operator pivotally mounted on said pin for moving said battery to energize said bulb whereby the light rays from said bulb can pass through the transparent body member to illuminate said bubble and the light rays can be directed onto any desired area.

2. The structure as defined in claim 1, and further including magnets mounted along the edges of the body member.

3. In a level, a transparent triangular body member provided with a circular opening therein, there being an elongated bore in said body member communicating with said opening, said bore including a first portion and a second portion which is of less diameter than said first portion, said first and second portions coacting to define therebetween a shoulder, a resilient ring abutting said shoulder, a bulb having a portion thereof engaging said ring, a battery movably positioned in the first portion of said bore and mounted for movement into and out of engagement with said bulb, a spring member positioned between said bulb and battery, a pin mounted in said body member and extending across the opening therein, and an operator pivotally mounted on said pin for moving said battery, magnets mounted along the edges of the body member, there being a cavity in said body member extending at right angles to one side of said body member and in parallel relation to another side of said body member, said cavity having a fluid provided with a bubble therein, said cavity having a barrel shape and whereby when said light bulb is energized by the movement of said battery, light rays from said bulb will pass through said transparent body to illuminate said bubble.

References Cited in the file of this patent

UNITED STATES PATENTS

| | | |
|---|---|---|
| 1,172,971 | Frank | Feb. 22, 1916 |
| 1,225,491 | Recker | May 8, 1917 |
| 2,305,678 | Cravaritis et al. | Dec. 22, 1942 |
| 2,752,693 | Wullschleger | July 3, 1956 |